(12) United States Patent
Gerber et al.

(10) Patent No.: US 8,262,363 B2
(45) Date of Patent: Sep. 11, 2012

(54) BLADE HAVING A DAMPING ELEMENT AND METHOD OF FABRICATING SAME

(75) Inventors: Brandon Gerber, Ware Shoals, SC (US); Nicholas K. Althoff, Ware Shoals, SC (US); Benoit Petitjean, Greer, SC (US)

(73) Assignee: General Electric Company, Schenectady, NY (US)

( * ) Notice: Subject to any disclaimer, the term of this patent is extended or adjusted under 35 U.S.C. 154(b) by 1213 days.

(21) Appl. No.: 12/049,722

(22) Filed: Mar. 17, 2008

(65) Prior Publication Data

US 2009/0232658 A1 Sep. 17, 2009

(51) Int. Cl.
*F03B 3/12* (2006.01)
(52) U.S. Cl. ............... 416/229 R; 416/500; 416/233
(58) Field of Classification Search ................. 416/500, 416/232, 233, 229 R
See application file for complete search history.

(56) References Cited

U.S. PATENT DOCUMENTS

| 2,689,107 | A | | 9/1954 | Odegaard |
| 3,103,977 | A | * | 9/1963 | Negroni ..................... 416/145 |
| 6,213,721 | B1 | * | 4/2001 | Watkinson ............... 416/244 A |
| 6,607,359 | B2 | | 8/2003 | von Flotow |
| 6,626,642 | B1 | | 9/2003 | Veldkamp |
| 6,672,837 | B1 | | 1/2004 | Veldkamp et al. |
| 6,676,380 | B2 | | 1/2004 | Davis et al. |
| 7,118,338 | B2 | | 10/2006 | Moroz et al. |
| 7,300,256 | B2 | | 11/2007 | Masserey et al. |
| 7,811,063 | B2 | * | 10/2010 | Bonnet ..................... 416/229 R |

FOREIGN PATENT DOCUMENTS

| WO | 9417303 | 8/1994 |
| WO | WO 9417303 A1 * | 8/1994 |

* cited by examiner

*Primary Examiner* — Edward Look
*Assistant Examiner* — Adam W Brown
(74) *Attorney, Agent, or Firm* — James McGinness, Esq.; Armstrong Teasdale LLP

(57) ABSTRACT

A blade for a wind turbine includes a body adapted for movement in response to wind flow past the blade body. The body has an inner surface defining an interior chamber and an opposite outer surface. At least one damping element extends from the inner surface of the body. The at least one damping element is configured to facilitate reducing an amount of noise generated by and propagating through the blade.

18 Claims, 4 Drawing Sheets

BLADE HAVING A DAMPING ELEMENT AND METHOD OF FABRICATING SAME

BACKGROUND OF THE INVENTION

The field of this invention relates generally to wind turbine blades, and more particularly to blades including damping elements that facilitate reducing the noise generated by the blades during operation of the wind turbine.

Wind turbines use wind energy to generate electricity. Known wind turbines include a tower, a nacelle coupled to the tower, and a rotor having a hub and blades coupled to the nacelle. Wind causes the blades and hub of the rotor to rotate with respect to the nacelle thereby creating mechanical energy that is transferred by a generator into useable electrical energy. At least some known utility grade wind turbines (i.e., wind turbines designed to provide electrical power to a utility grid) use long rotor blades (e.g., 30 meters or more in length).

However, at least some known wind turbines may generate unacceptable levels of noise during their operation, especially when the wind turbines generators are located in close relation to populated areas. A portion of the noise emitted by wind turbine can be attributed to the rotation of the blades. At least some known blades emit noise by displacing and scattering highly turbulent air during rotation. In addition, at least some blades are formed with a hollow interior, and such blades may emit noise during operation that generates within the interior of the blade. For example, noises may promulgate from one or more of various mechanical components (e.g., a gear box housed in the nacelle) of the wind turbine. Such noises may resonate within the hollow interior of the blades.

In addition, loose debris within the interior of the blade (e.g., dried or loose adhesive) may tumble from one end of the blade to the other during rotation of the blade. Specifically, as it tumbles, the debris hits against the interior surface of the blade generating additional noise, such noise generation is sometimes referred to as the "rainstick effect". In addition to noise concerns, the debris hitting against the interior surface of the blade may cause structural damage to the blade.

BRIEF DESCRIPTION OF THE INVENTION

In one aspect, a blade for a wind turbine generally includes a body adapted for movement in response to wind flow past the blade body. The body has an inner surface defining an interior chamber and an opposite outer surface. At least one damping element extends from the inner surface of the body. The at least one damping element is configured to facilitate reducing an amount of noise generated by and propagating through the blade.

In another aspect, a wind turbine includes a tower, a nacelle coupled to the tower, and a rotor coupled to the nacelle. The rotor includes a hub and at least one blade extending outwardly from the hub. The blade has a body adapted for movement in response to wind flow past the body to produce rotation of the rotor. The body includes an outer skin, an inner skin and an air gap defined between the inner and outer skins.

In yet another aspect, a method of fabricating a blade for a wind turbine includes fabricating a body having an inner surface that defines an interior chamber. At least one damping element is affixed to the inner surface of the body.

DETAILED DESCRIPTION OF THE INVENTION

Figure 1:
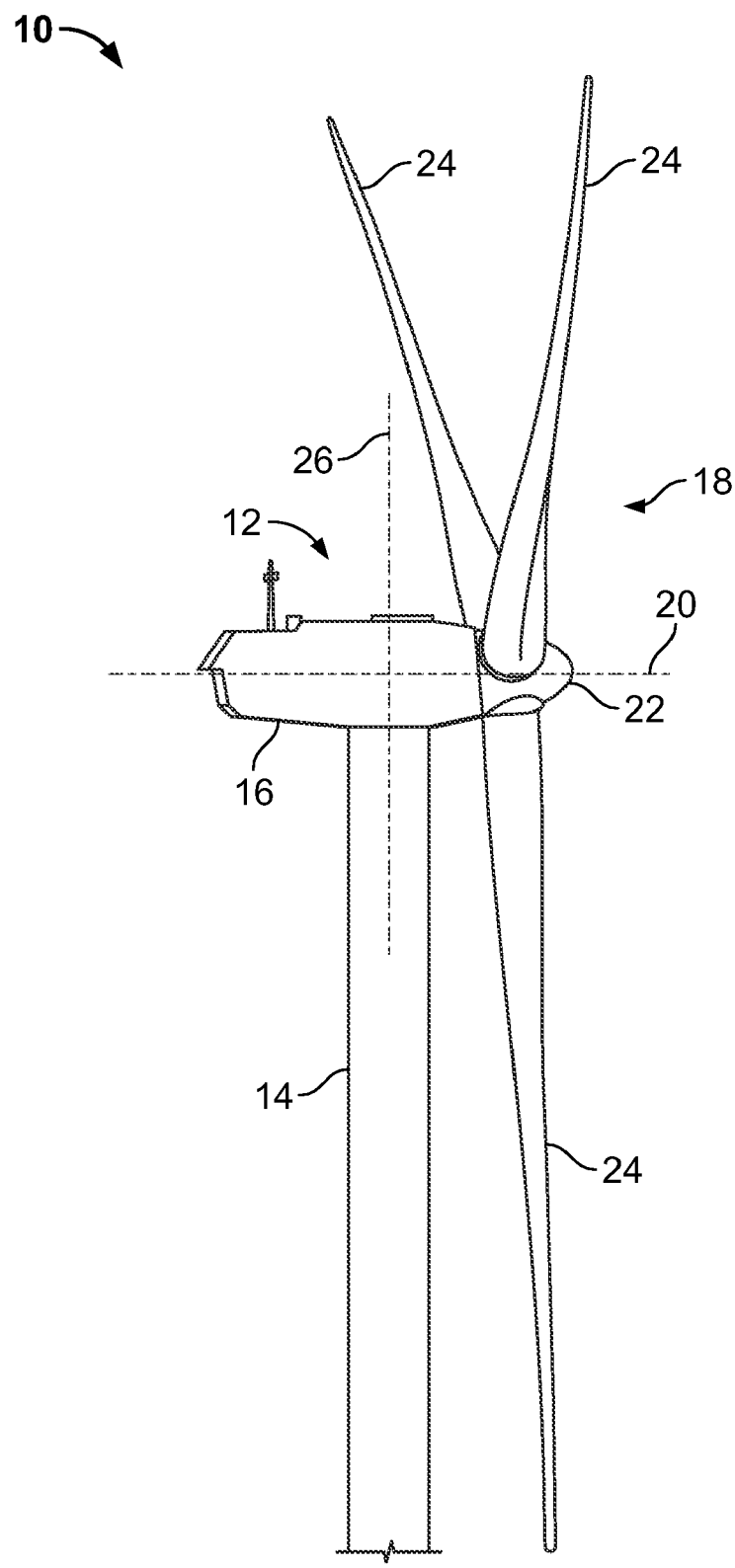
FIG. 1 is a perspective view of an exemplary wind turbine.

Referring now to the drawings, and more specifically to FIG. 1, an exemplary wind turbine is designated in its entirety by reference numeral 10. Wind turbine 10 includes a generator 12 for use in generating electrical power from wind energy. In the exemplary embodiment, wind turbine 10 has a horizontal-axis configuration. Alternatively, in some embodiments, wind turbine 10 may include, in addition to, or in the alternative to, the horizontal-axis configuration, a vertical-axis configuration (not shown). Moreover, although only one wind turbine 10 is illustrated in FIG. 1, in some embodiments a plurality of wind turbines 10 may be grouped together in an arrangement, sometimes referred to as a "wind farm".

Generator 12 is coupled to and supported by a tower 14 (only a portion of which is shown in FIG. 1). Moreover, in the exemplary embodiment, generator 12 includes a nacelle 16 and a rotor 18 coupled to nacelle 16 for rotation about a first axis of rotation 20. Rotor 18 includes a hub 22 and a plurality of blades 24 (sometimes referred to as "airfoils") that extend radially outwardly from hub 22 for converting wind energy into rotational energy. Rotor 18 is described and illustrated herein as having three blades 24. However, rotor 18 may have any number of blades 24.

Figure 2:
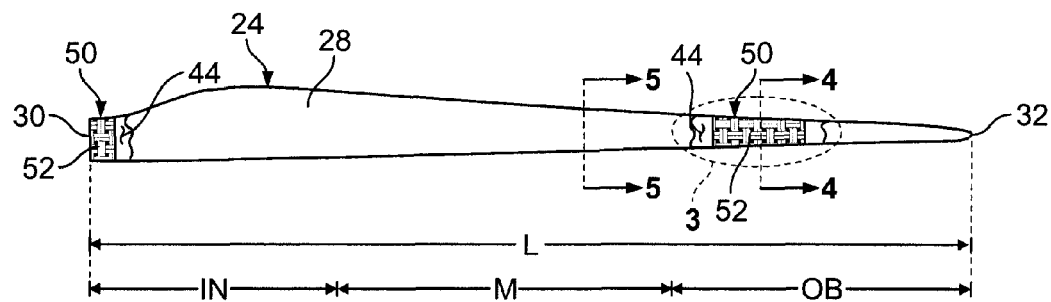
FIG. 2 is a side elevational view of an exemplary blade that may be used with the wind turbine shown in FIG. 1 and with portions of the blade broken away to illustrate exemplary damping elements.

With reference now to FIG. 2, each blade 24 may have any suitable length L that enables rotor 18 to function as described herein. For example, in one embodiment, one or more blades 24 have a length of about 30 meters. In another embodiment, one or more blades 24 have a length of about 50 meters. Other examples of suitable blade lengths L include lengths L of about 10 meters, about 20 meters, about 37 meters, and about 40 meters. Moreover, despite how blades 24 are illustrated in FIGS. 1 and 2, rotor 18 may have blades of any shape, and may have blades of any type and/or any configuration, whether such shape, type, and/or configuration is described and/or illustrated herein. For example, blades 24 can be of the type, shape, and/or configuration suitable for use in a ducted rotor (not shown) having a turbine (not shown) contained within a duct (not shown). In another example, blades 24 can be of the type, shape, and/or configuration suitable for use in a darrieus wind turbine, sometimes referred to as an "egg-beater" turbine. In yet another example, blades 24 can be of the type, shape, and/or configuration for use in a savonious wind turbine. Moreover, wind turbine 10 may, in some embodiments, be a wind turbine wherein rotor 18 generally faces upwind to harness wind energy, and/or may be a wind turbine wherein rotor 18 generally faces downwind to harness energy. Alternatively, rotor 18 may be oriented at any orientation or angle (which may be variable) with respect to a direction of the wind that enables energy to be harnessed therefrom.

Generator 12 includes an electrical generator (not shown) that is coupled to, and housed within, nacelle 16. The electrical generator is operatively connected to rotor 18 for generating electrical power from the rotational energy generated by rotor 18 via blades 24. General operation of the electrical generator to generate electrical power from the rotational energy of rotor 18 is known in the art.

In some embodiments, wind turbine 10 may include one or more controllers (not shown) mounted inside nacelle 16 and operatively connected to some or all of the components of wind generator 12 for controlling operation of wind generator 12 and/or as some or all of the components thereof. For example, the controller(s) may be used for but are not limited to overall system monitoring and control including, for example, pitch and speed regulation, high-speed shaft and yaw brake application, yaw and pump motor application, and fault monitoring. Alternative distributed or centralized control architectures may be used in some embodiments. In some embodiments, wind generator 12 may include a brake (not shown) mounted inside nacelle 16 for braking rotation of rotor 18 to, for example, reduce the generation of electrical power from the electrical generator. Furthermore, in some embodiments, wind generator 12 may include a yaw drive (not shown) for rotating wind generator 12 about a second axis of rotation 26 for changing a yaw of rotor 18, and more specifically for changing a direction faced by rotor 18 to, for example, adjust a relative angle between the direction faced by rotor 18 and a direction of wind. Moreover, in some embodiments the wind generator 12 may include an anemometer (not shown) for measuring wind speed. The anemometer, in some embodiments, may be operatively connected to the controller(s) for sending measurements to the controller for processing thereof. In some embodiments, wind generator 12 includes a wind vane (not shown) for measuring wind direction. The wind vane, in some embodiments, may be operatively connected to the controller(s) and/or the yaw drive for changing a yaw of rotor 18. In some embodiments, wind generator 12 includes a variable blade pitch drive (not shown) for controlling a pitch of rotor blades 24. The variable blade pitch drive may be operatively connected to the controller(s) for control thereby. In some embodiments, the pitches of blades 24 are individually controlled by the blade pitch drive. General operation of wind turbine 10, and more specifically wind generator 12, is known in the art and therefore will not be described in more detail herein.

Figure 5:
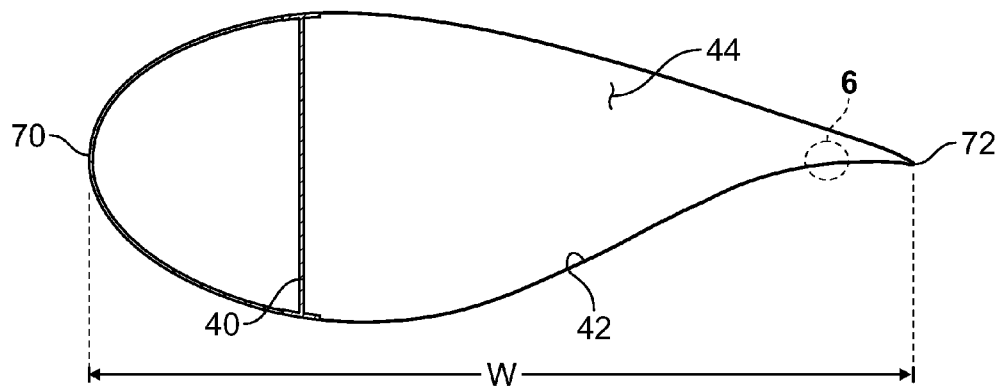
FIG. 5 is a cross sectional view of the blade shown in FIG. 2 and taken along line 5-5.
Figure 6:
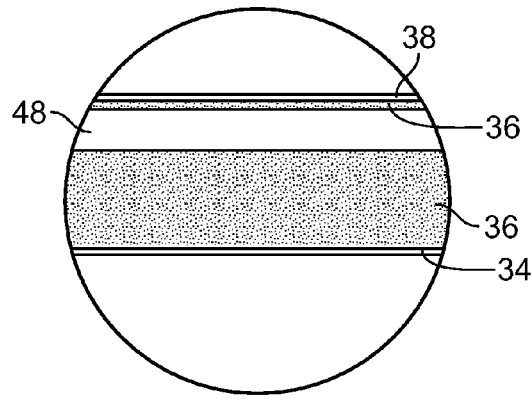
FIG. 6 is an enlarged cross sectional view of a portion of the blade shown in FIG. 5.

As illustrated in FIG. 2, in the exemplary embodiment, each blade 24 includes a body 28 having a length L measured between a root 30 and a tip 32 of the blade 24. Root 30 enables blade 24 to be coupled to hub 22. Body 28 includes an inboard section IN (generally the innermost one-third of the blade), an outboard section OB (generally the outermost one-third of the blade), and a middle section M extending between the inboard and outboard sections IN and OB, respectively. Body 28 is adapted for movement in response to wind flow to produce electricity via generator 12. In the exemplary embodiment, each body 28 twists approximately 90° along its length L as it extends from the inboard section IN to the outboard section OB. It is understood, however, in other embodiments that body 28 could twist more or less than 90° along its length L, including not being twisted at all (i.e., straight). As mentioned above, blade 24 can have different shapes, sizes and configurations than those illustrated and described herein without departing from the scope of this invention. As best illustrated in FIGS. 5 and 6, each body 28 includes an inner surface 42 that is defined by an inner skin 38. FIG. 5 is a cross sectional view taken along line 5-5 and FIG. 6 is an enlargement of a portion of FIG. 5. Inner surface 42 of body 28 defines an interior hollow chamber 44 within blade 24.

Figure 3:
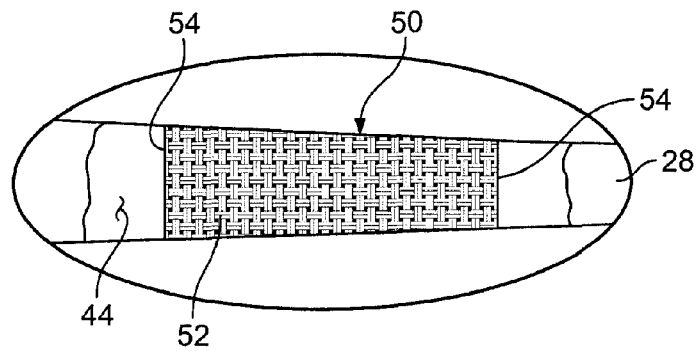
FIG. 3 is an enlarged side view of a portion of the blade shown in FIG. 2.
Figure 4:
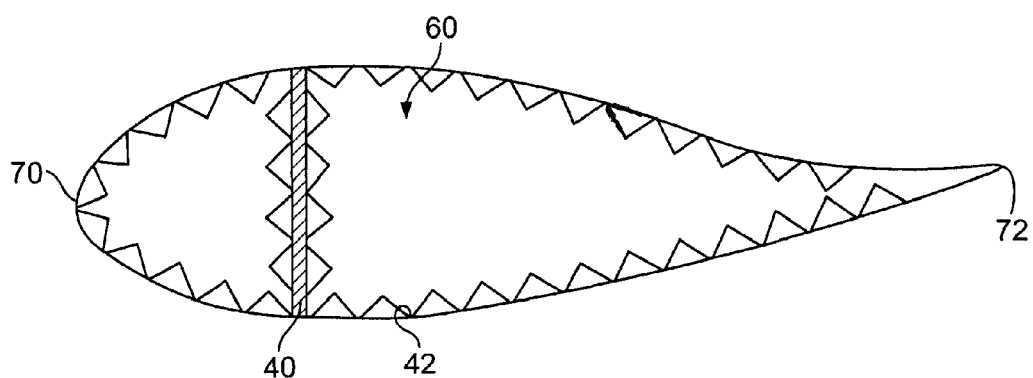
FIG. 4 is a cross sectional view of the blade shown in FIG. 2 and taken along line 4-4.

In the exemplary embodiment, at least one damping element 50 configured to facilitate reducing an amount of noise generated by and propagating through blade 24 is coupled to body inner surface 42 via gluing or any other suitable bonding means. In the exemplary embodiment, blade body 28 includes two damping elements 50 that are in the form of a pair of spaced acoustical dampers 52. More specifically in the exemplary embodiment, one of the acoustical dampers 52 is coupled within inboard section IN adjacent to body root 30, and the other acoustical damper 52 is coupled within body outboard section OB at a location that is spaced inward from tip 32. In the exemplary embodiment, body middle section M does not include any damping elements 50. However, it should be understood that body 28 can include only one damping element 50, or more than two damping elements 50, without departing from the scope of this invention. It is also understood that damping elements 50 can be located at any location along the length L of blade body 28. With reference to FIGS. 3 and 4, each acoustical damper 52 includes a matched pair of spaced bulkheads 54 that each have a shape (generally circular or teardropped) that substantially corresponds to a cross-sectional shape of body 28. Bulkheads 54 substantially closes off a cavity and does not necessarily extend across the entire width of body 28 due to existing structures within the body (e.g., shear webs). Bulkheads 54 cooperate with body inner surface 42 to form an acoustical box 60 defined within body interior chamber 44. In the exemplary embodiment, box 60 is substantially enclosed. FIG. 3 is an enlargement of a portion of FIG. 2, and FIG. 4 is a cross sectional view taken along line 4-4. While bulkheads 54 are illustrated herein as being a pair, it should be understood that more or fewer (e.g., one) bulkheads can be used.

In the exemplary embodiment, acoustical box 60 is formed with a predetermined volume. The frequency or range of frequencies of noise attenuated by acoustical damper 52 is at least partially dependent on the volume of acoustical box 60. Increasing the volume of acoustical box 60 results in a larger range of frequencies of noise being attenuated by acoustical damper 52. In one embodiment, the volume of acoustical box 60 is between approximately 4 cubic meters (m$^3$) and approximately 40 m$^3$. It is understood, however, that the volume of the acoustical box 60 can be more than about 40 m$^3$ or less than about 4 m$^3$ without departing from the scope of this invention. In one embodiment, acoustical box 60 is defined by substantially the entire interior chamber 44 of body 28. That is, in such an embodiment, acoustical box 60 and body interior chamber 44 are coextensive. However, forming all of inner surface 42 significantly increases the fabrication costs and an overall weight to blade 24. Thus, the volume of acoustical box 60 can be variably selected to facilitate attenuating selected frequencies of noise, while reducing the amount of acoustical damper 52 materials to facilitate minimizing the cost and weight of blade 24.

Bulkheads 54 and the portion of body inner surface 42 of blade 24 extending between adjacent bulkheads 54 are substantially covered by acoustical damper 52. In other words, body interior surfaces 42 within acoustical box 60 are substantially covered by acoustical damper 52. In one embodiment, acoustical damper 52 is selected from a group of damping materials such as, but not limited to, rubber, foam, mineral wool, expanding foam, fiberglass, felt, and/or kaoline wool. Alternatively, acoustical damper 52 can be any material that facilitates damping as described herein. Moreover, acoustical damper 52 can have any suitable shape including, but not limited to, conical, frustum, pyramidal, and/or wavy. In one embodiment, acoustical damper 52 is ALPHAPYRAMID acoustical foam commercially available from Acoustical Solutions, Inc. of Richmond, Va., USA. In another embodiment, acoustical damper 52 is a coating that is applied to the interior surfaces of acoustic box 60. It is contemplated that any suitable acoustically damping material can be affixed to the interior surfaces of acoustic box 60 and that the acoustically damping material can be of any suitable shape or configuration. It is also contemplated that only a portion of the interior surfaces 42 of acoustic box 60 can be covered by acoustical damper 22.

In some embodiments, such as the embodiment illustrated in FIG. 6, blade body 28 is fabricated using one or more laminated fiber layers, such as, but not limited to, glass and/or carbon fibers, that form an outer skin 34 of body 28. As illustrated in FIG. 6, body 28 includes a core material 36 that is sandwiched between outer skin 34 and inner skin 38. An air gap 48 is defined within a portion of core material 36. Air gap 48 facilitates attenuating noise by, for example, but not limited to, inhibiting sound waves promulgating from outer skin 34 due to turbulent air flow over outer skin 34 from transferring to inner skin 38. This facilitates reducing an amount of sound waves reaching interior chamber 44 of body 28 where the sound waves can resonate. Thus, air gap 48 facilitates decreasing the noise level emitted wind turbine 10.

In the exemplary embodiment, air gap 48 is defined closer to inner skin 38 than to outer skin 34, but it should be understood that air gap 48 can be located anywhere between inner skin 38 and outer skin 34. In one embodiment, air gap 48 extends less than the full length L of blade body 28. For example, in such an embodiment, air gap 48 may only extend through body outboard section OB or through a portion of outboard section OB. It should be understood, however, that air gap 48 can extend continuously throughout the entire blade body 28 or within different isolated sections of blade body 28 without departing from the scope of this invention.

As best illustrated in FIG. 5, blade body 28 also has a width W (or lateral distance) measured between a leading edge 70 and a trailing edge 72 of body 28. In one embodiment, air gap 48 extends less than width W of body 28. For example, in such an embodiment, air gap 48 extends less than 50 percent of body width W. In another example, air gap 48 extends less than 33 percent of width W of body 28. In yet another example, air gap 48 extends less than 25 percent of width W of body 28. Moreover, in another embodiment, air gap 48 is positioned closer to trailing edge 72 than leading edge 70. It should be understood, however, that air gap 48 can be defined within any portion of blade body 28 without departing from the scope of this invention.

In one embodiment, such as is illustrated in FIG. 5, an interior web 40 extends the length L of blade body 28 for generally supporting and/or strengthening blade 24. It should be understood that body 28 may include more than one web 40, or no webs at all, without departing from the scope of this invention. It should also be understood that other suitable structure(s) may be used to internally support body 28 against, for example, buckling due to wind loading.

Figure 7:
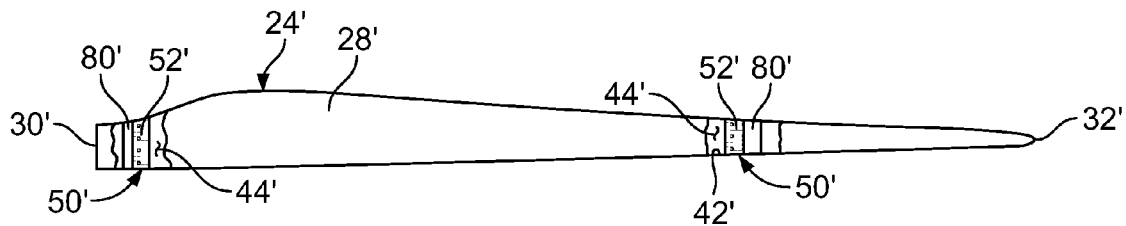
FIG. 7 is a side view of an alternative blade that may be used with the wind turbine shown in FIG. 1 with portions broken away and that includes an acoustical damper and an impact damper.

In another embodiment of blade 24', such as is illustrated in FIG. 7, damping elements 50' include an acoustical damper 52' (similar to acoustical damper 52 described above with respect to FIGS. 1-6) and an impact damper 80' for damping the noise promulgating from wind turbine 10 caused by loose debris within an interior chamber 44' of a body 28' of blade 24' tumbling during rotation of blade 24'. As blade 24' tumbles, debris therein hits against blade interior surface 42' causing noise, which is sometimes referred to as the "rainstick effect". In addition to promulgating noise, debris hitting against blade interior surface 42' may cause structural damage to blade 24'.

As illustrated in FIG. 7, the impact damper 80' of damping element 50' is positioned in inboard section IN of body 28' and closer to root 30' than to acoustical damper 52'. Moreover, impact damper 80' of damping element 50' is positioned in the outboard section OB of body 28' and is located closer to tip 32' than to the associated acoustical damper 52'. It should be understood, however, that impact dampers 80' can be located on either side of damping elements 50. Impact dampers 80' facilitate inhibiting loose debris within body interior chamber 44' from falling the full length L of blade 28'. Rather, any loose debris near root 30' or tip 32' of blade 28' would fall only a short distance during rotation of blade 28'. As such, dampeners 80 facilitate significantly reducing noise caused by loose debris and facilitate reducing potential structural damage to blade 28' caused by debris tumbling within chamber 44' during rotation of blade 28'.

Impact dampers 80' can be fabricated from any suitable material. For examples, impact dampers 80' may be fabricated from, but not limited to, a rubber, an expandable foam, loose fiberglass and/or felt. Alternatively, impact dampers 80' may be fabricated from any suitable material(s) that enables dampers 80' to function as described herein.

Figure 8:
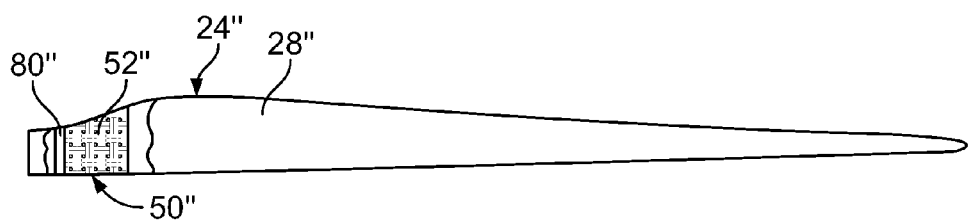
FIG. 8 is a side view of another alternative blade that may be used with the wind turbine shown in FIG. 1 with a portion broken away and that includes an acoustical damper and an impact damper.

FIG. 8 illustrates an alternative embodiment of a blade 24" that may be used with wind turbine 10 (shown in FIG. 1). In this embodiment, however, blade 24" includes only a single damping element 50" that includes an impact damper 80" and an acoustical damper 52" in body inboard section IN. The impact damper 80" and acoustical damper 52" are similar to impact damper 80' and acoustical damper 52' (each shown in FIG. 7) and, therefore, will not be described in detail. In this embodiment, middle section M and outboard section OB of body 28 do not include damping elements 50". It should be understood, however, that damping element 50" can be located in middle section M and/or outboard section OB in addition to, or instead of, inboard section IN.

Figure 9:
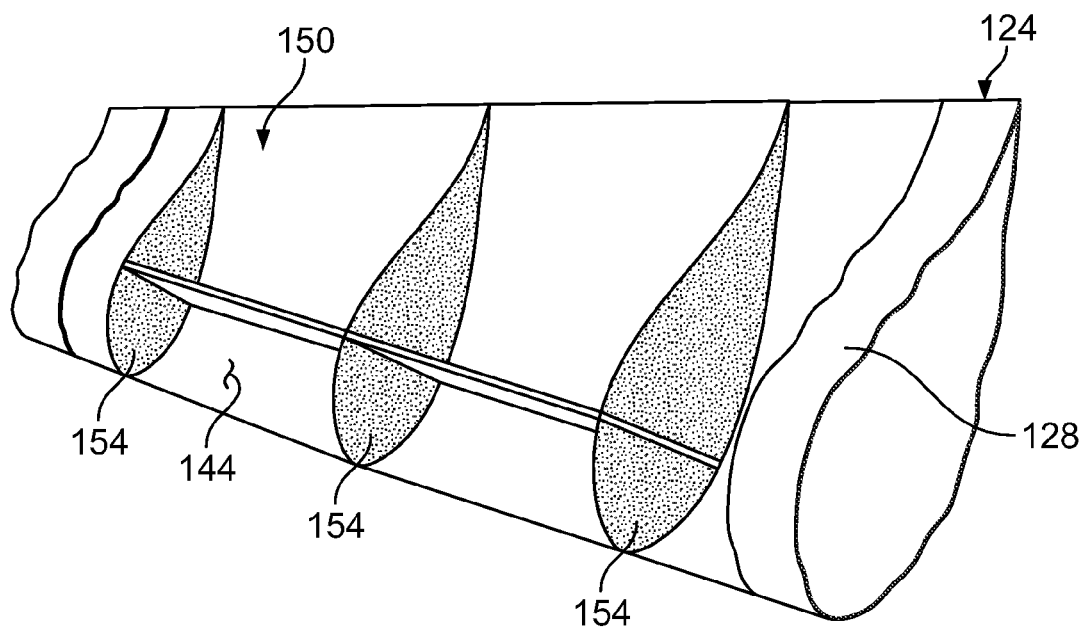
FIG. 9 is an enlarged perspective view of a portion of yet another alternative blade with a portion broken away and that includes spaced acoustical dampers.

FIG. 9 illustrates yet another alternative embodiment a blade 124 that may be used with wind turbine 10 (shown in FIG. 1) and that includes a damping element 150. In the exemplary embodiment, damping element 150 includes a plurality of bulkheads 154 that are spaced throughout an interior chamber 144 of a body 128 of blade 124. Bulkheads 154 can be fabricated in the form of acoustical dampers and/or impact dampers as described above.

Figure 10:
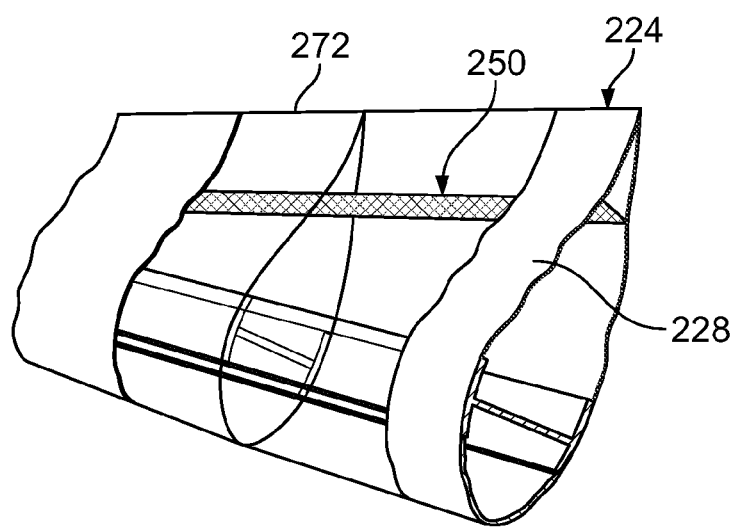
FIG. 10 is an enlarged perspective view of a portion of a further alternative blade with a portion broken away and that includes a longitudinally extending acoustical damper.

FIG. 10 illustrates yet another alternative embodiment of a blade 224 that may be used in wind turbine 10 (shown in FIG. 1) and that includes a damping element 250. In the exemplary embodiment, damping element 250 extends longitudinal within a body 228 of blade 224 adjacent a trailing edge 272 thereof. In one configuration, the damping element 250 is located in the outer 20 percent to 50 percent of blade 224. Damping element 250 can be fabricated in the form of an acoustical damper and/or an impact damper as described above.

An exemplary method of fabricating a blade that may be used with wind turbine 10, such as blade 24 illustrated in FIGS. 1-6, includes fabricating a body 28 with an inner surface 42 that defines an interior chamber 44. In one embodiment, the body 28 is fabricated with a laminate defined by an outer skin 34, an inner skin 38, and a core 36 that is sandwiched between the inner and outer skins 38 and 34, respectively. As described above, core 36 includes an air gap 48. Moreover, at least one damping element 50 is coupled (e.g., glued) to body inner surface 42. The damping element 50 can be fabricated to be an acoustical damper 52 and/or an impact damper (e.g., impact dampers 80', 80" of FIGS. 7 and 8, respectively). In each embodiment, a damping material(s) covers any bulkheads 54 coupled to body 28 within interior chamber 44 and at least a portion of body inner surface 42 located between a pair of spaced bulkheads 54.

Embodiments of methods and blades of the present invention are described and illustrated herein with respect to a wind turbine, and more specifically, a wind generator. However, embodiments (whether described and/or illustrated herein) of the methods and blades of the present invention are not limited to wind generators, nor wind turbines generally. Rather, embodiments (whether described and/or illustrated herein) of the methods and blades of the present invention may be applicable to other things having one or more blades.

Exemplary embodiments of the present invention are described and/or illustrated herein in detail. The embodiments are not limited to the specific embodiments described herein, but rather, components and steps of each embodiment may be utilized independently and separately from other components and steps described herein. Each embodiment's components and steps can also be used in combination with other embodiment's (whether described and/or illustrated herein) components and/or steps.

When introducing elements of the embodiments of the present invention, the articles "a", "an", "the" and "said" are intended to mean that there are one or more of the elements. The terms "comprising", "including" and "having" are intended to be inclusive and mean that there may be additional elements other than the listed elements. Moreover, use of the term "portion" with respect to something is intended to some or all of the thing.

While the invention has been described in terms of various specific embodiments, those skilled in the art will recognize that embodiments (whether described and/or illustrated herein) of the present invention can be practiced with modification within the spirit and scope of the claims.

What is claimed is:

1. A blade for a wind turbine, said blade comprising:
a body adapted for movement in response to wind flow past said blade body, said body comprising an outer skin, an inner skin and an air gap defined between said inner and outer skins; and
at least one acoustical damping element coupled to and extending from said inner skin of said body, said at least one acoustical damping element configured to facilitate reducing an amount of noise generated by and propagating through said blade.

2. The blade of claim 1, wherein said body comprises an inboard section, an outboard section, and a middle section extending between said inboard and outboard sections, said at least one acoustical damping element is disposed in at least one of said inboard section and said outboard section.

3. The blade of claim 2, wherein said at least one acoustical damping element is coupled within said body inboard section.

4. The blade of claim 2, wherein said at least one acoustical damping element is coupled within said body outboard section.

5. The blade of claim 1, wherein said at least one acoustical damping element comprises at least one bulkhead.

6. The blade of claim 5 wherein said at least one bulkhead and at least a portion of said body inner skin are covered with a damping material.

7. The blade of claim 6, wherein said damping material is selected from a group of materials consisting of rubber, foam, mineral wool, expanding foam, fiberglass, felt, and kaoline wool.

8. The blade of claim 5, wherein said acoustical damping element has a conical shape.

9. The blade of claim 5, wherein said at least one bulkhead comprises an impact damper.

10. The blade of claim 1, wherein said blade further comprises a leading edge and a trailing edge, said at least one acoustical damping element extends substantially longitudinally within said body adjacent to and approximately 25 percent chord length from said trailing edge.

11. A wind turbine comprising:
a tower;
a nacelle coupled to said tower; and
a rotor coupled to said nacelle, said rotor comprising a hub and at least one blade extending outwardly from said hub, said blade comprising a body adapted for movement in response to wind flow past said body to produce rotation of the rotor, said body comprising an outer skin, an inner skin and an air gap defined between said inner and outer skins.

12. The wind turbine of claim 11, wherein said body further comprises an inboard section, an outboard section, and a middle section extending between said inboard and outboard sections, said air gap is defined in said outboard section of said body.

13. The wind turbine of claim 12, wherein said blade further comprises a leading edge and a trailing edge, and has a lateral distance measured between said leading and trailing edges, said air gap extends a length less than one-third said lateral distance of said body.

14. The wind turbine of claim 11, wherein said body further comprises an inner surface defining an interior chamber, at least one damping element is affixed to said inner surface of said body.

15. The wind turbine of claim 14, wherein said at least one damping element comprises an impact damping member and an acoustic damping member configured to facilitate reducing an amount of noise generated by said blade.

16. A method of fabricating a blade for a wind turbine, said method comprising:
fabricating a body having an inner surface that defines an interior chamber;
fabricating said body with an outer skin, an inner skin and an air gap located between said inner and outer skins; and
affixing at least one acoustical damping element to said inner surface of said body.

17. The method of claim 16, further comprising coupling at least one bulkhead to said body within said interior chamber.

18. The method of claim 17, further comprising covering said bulkheads and at least a portion of said inner surface of said blade between said bulkheads with said damping element.

* * * * *